United States Patent [19]
Eberle

[11] 4,400,120
[45] Aug. 23, 1983

[54] APPARATUS FOR REMOVING TEMPORARY SIDE TERMINALS FROM BATTERIES

[75] Inventor: William J. Eberle, Reading, Pa.

[73] Assignee: General Battery Corporation, Reading, Pa.

[21] Appl. No.: 152,090

[22] Filed: May 21, 1980

[51] Int. Cl.³ .............................................. B23C 3/00
[52] U.S. Cl. .................................. 409/132; 29/623.1; 29/730; 408/1 R; 408/43; 408/51; 408/53; 409/172; 409/174; 409/188
[58] Field of Search ...................... 29/563, 623.1, 730; 409/132, 184, 185, 186, 188, 203, 172, 174; 408/46, 1 R, 50, 51, 53, 42, 43, 7, 12; 198/345

[56] References Cited

U.S. PATENT DOCUMENTS

| | | | |
|---|---|---|---|
| 1,248,443 | 12/1917 | Bowler | 29/623.1 X |
| 2,886,988 | 5/1959 | Gordon | 408/46 |
| 4,013,864 | 3/1977 | Tiegel et al. | 29/730 X |
| 4,162,134 | 7/1979 | Kitagawa | 408/46 |
| 4,198,736 | 4/1980 | Eberle | 408/53 X |

FOREIGN PATENT DOCUMENTS

2350922 12/1977 France ................................... 408/7

*Primary Examiner*—Z. R. Bilinsky

*Attorney, Agent, or Firm*—Benasutti and Murray

[57] ABSTRACT

An apparatus for removing temporary side post terminals of at least one multi-celled battery case for lead acid automobile batteries is disclosed. The subject apparatus comprises a horizontal transversely reciprocating work station containing a plurality of milling heads. The work station is also designed to first sense that batteries being operated upon are in a proper position for post removal and then to clamp them in that position until the temporary side posts are machined off by said milling heads. The apparatus further comprises conveyor means adapted to bring the battery cases into the apparatus and then to remove them from the apparatus after the side terminal removal operation is completed. Another feature of the conveyor is a horizontal guide to intercept skewed and misaligned battery cases and to correctly position them against the outer sidewall of the conveyor for proper side post removal. There is also pivotal gate means adapted to stop the batteries and hold them in the apparatus while the machining operation is underway and then to release them so that they may exit the system on said conveyor. This gate is controlled by an internal programming means which also establishes the timing sequence of all of the other operations performed within said apparatus.

5 Claims, 3 Drawing Figures

APPARATUS FOR REMOVING TEMPORARY SIDE TERMINALS FROM BATTERIES

BACKGROUND OF THE INVENTION

1. Field of the Invention

The disclosed apparatus is intended for use in the manufacture of lead acid storage batteries and especially for use automotive storage batteries having side terminals. The side terminal storage battery differs from the normal top terminal post battery in that the electrical connections are made by fastening electrical cables to threaded inserts in one side of the battery instead of clamping them to the positive and negative top posts common to most automotive batteries.

2. Prior Art

The development of the side terminal battery is relatively recent in the field of automotive batteries. As a result, the majority of the equipment utilized in current battery fabrication facilities is primarily adapted to be used with older, more commonly used top terminal batteries. Its application to side terminal battery processing has frequently involved the use of awkward and potentially dangerous adaptors which do not always lend themselves to quality production. To avoid the unnecessary duplication of equipment, or the use of these adaptors, a battery case having a pair of side terminals, each with a temporary integral forming post, similar to that in top terminal batteries was developed. This temporary post-like terminal is used during the battery formation stage of manufacture and is then later removed to be replaced with the threaded inserts normally used. While there have been many attempts in the prior art to remove these temporary side terminals by using milling machines and similar equipment, these were normally constructed to operate either on a single terminal or at least simultaneously on the terminals of a single battery in a discontinuous, manually controlled procedure. The present apparatus is designed to automatically remove the side terminals from a plurality of batteries as a part of an overall manufacturing operation so that both quality and quantity of production are improved.

SUMMARY OF THE INVENTION

The principal object of the subject invention is to provide an apparatus for automatically removing temporary side battery terminals simultaneously from a plurality of batteries, both quickly and economically.

It is a further object of the subject invention, to provide an apparatus which is adaptable to a variety of battery sizes without substantial modification being necessary.

To achieve these objects, the subject apparatus comprises reciprocating cutting means, slideably mounted on an adjustable work station, which is adapted to remove temporary battery side posts. In the preferred embodiment, this removal is accomplished by providing a plurality of horizontal disposed transversely oriented milling heads which when set up within the station are adjustable in terms of relative side to side spacing to allow the easy accommodation of different sized batteries. The station itself contains a programmable adjustment capability so that the depth of cut on any given terminal configuration may also be controlled.

The passage of battery cases into and out of the subject apparatus is accomplished by a conveyor system which contains means adapted to stop the cases within the work station and to cooperate with the reciprocal cutting means so that they are clamped in the proper position for side terminal removal. When the cases first enter the apparatus they encounter a guide which acts to direct them on to assume a longitudinally, oriented disposition along one side wall of the conveyor. Passage out of the station is prevented by a rotatable gate which remains closed until side terminal removal is accomplished.

In the current operating system, the work station is adapted to accommodate two batteries but there is nothing to prevent it from being made in either smaller or larger configurations, should this be desirable. The station may also contain sensing means to determine that the requisite number of batteries have entered the station. In a high volume production line, the operation described hereinbelow may be controlled by relatively simple timing means. Here too, however, more elaborate optical or other sensing and control systems can be used, if their use is warranted, without departing from the spirit of my invention.

When the requisite number of batteries have been admitted, the cutting means begins to advance across the conveyor so that the milling heads can make contact to remove the temporary side terminal posts. Before contact is made, however, the batteries are first positioned along the conveyor by a tapered separator block, which is adapted to be inserted between the two batteries and to spread them apart so that they are exactly, and properly positioned relative to the advancing milling heads. Once the batteries are properly separated side to side, they are next clamped in place by a set of spring loaded buffer blocks which contact the batteries and clamp them against the sidewall of the conveyor, at which time the terminals are ready to be removed by the milling heads in accordance with the programmed instructions given to the reciprocating cutting means. After the proper amount of material is removed, the cutting means retract to release the batteries, the gate opens, the completed batteries exit the system and two new batteries enter for subsequent processing. Thus are the principal objects, as given above, achieved.

These and other objects of my invention will become apparent from the following description with reference to the accompanying drawings.

DESCRIPTION OF THE PREFERRED EMBODIMENT

Figure 1:
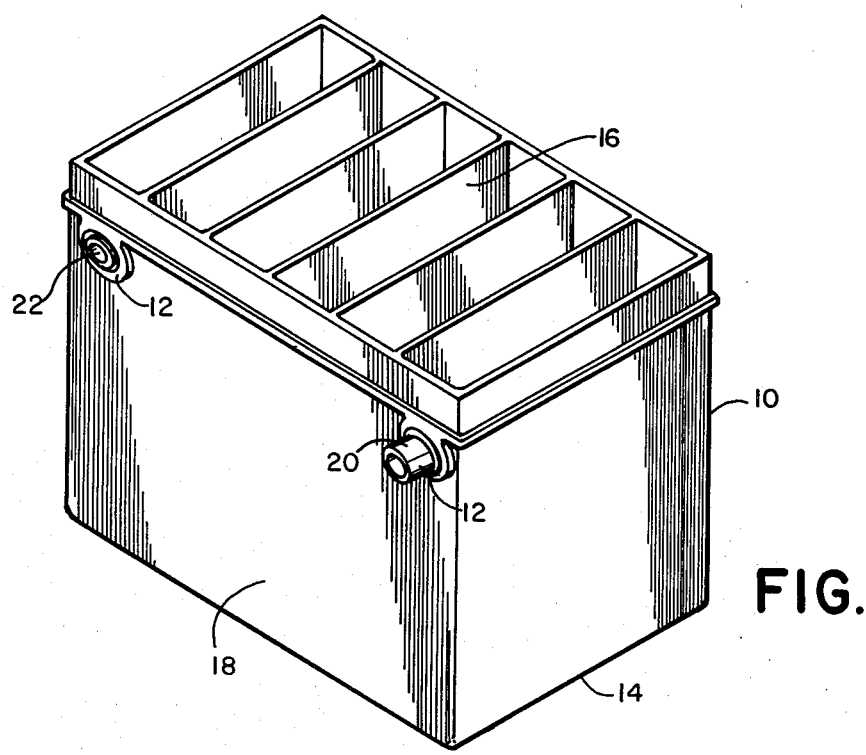
FIG. 1 is an isometric drawing of a typical side terminal battery showing both a temporary cast-on side post terminal and the appearance of the terminal after the temporary side post has been removed.

Referring now to FIG. 1, there is shown a battery case 10 of the type having temporary side connections 12 cast thereon. As shown, the case is fabricated in the form of a rectilinear plastic or rubber shell 14, having a plurality of internal dividers 16 which form the individual cells of the battery, and one wall 18 wherein a pair of side terminal connections 12 are located. As shown, one of these terminals has a temporary terminal post 20 thereon, while the other is shown after this temporary terminal has been removed, leaving a threadable insert 22 in which form the batteries, after the remainder of the fabrication operations are completed, is sold.

Figure 3:
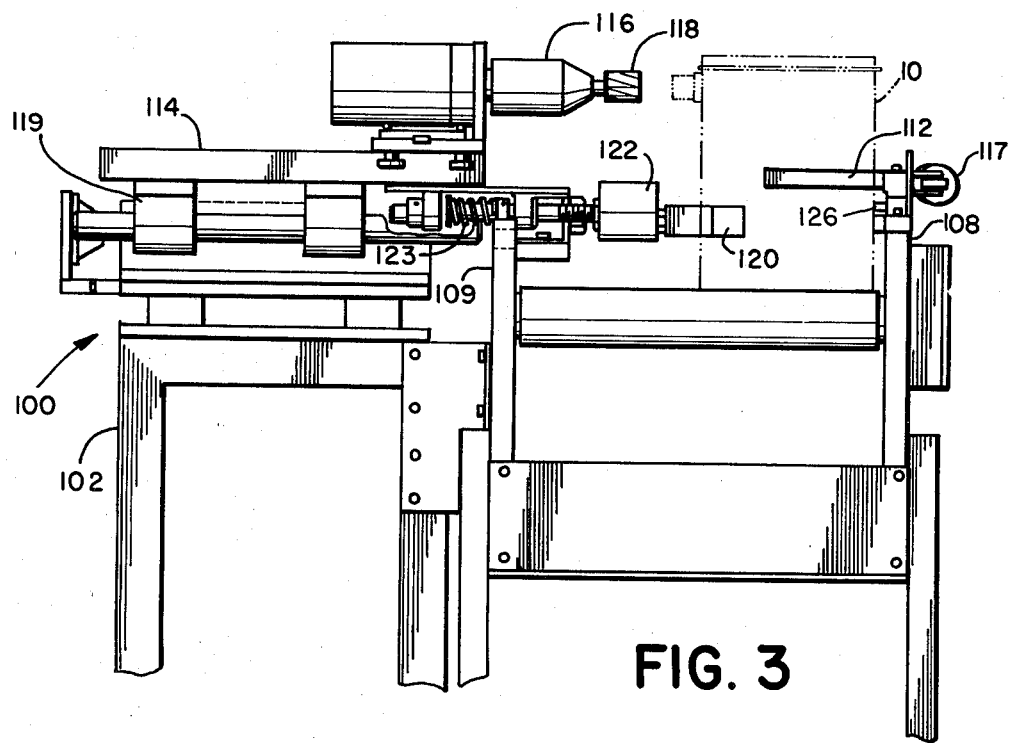
FIG. 3 is an end view of the apparatus shown in FIG. 2.
Figure 2:
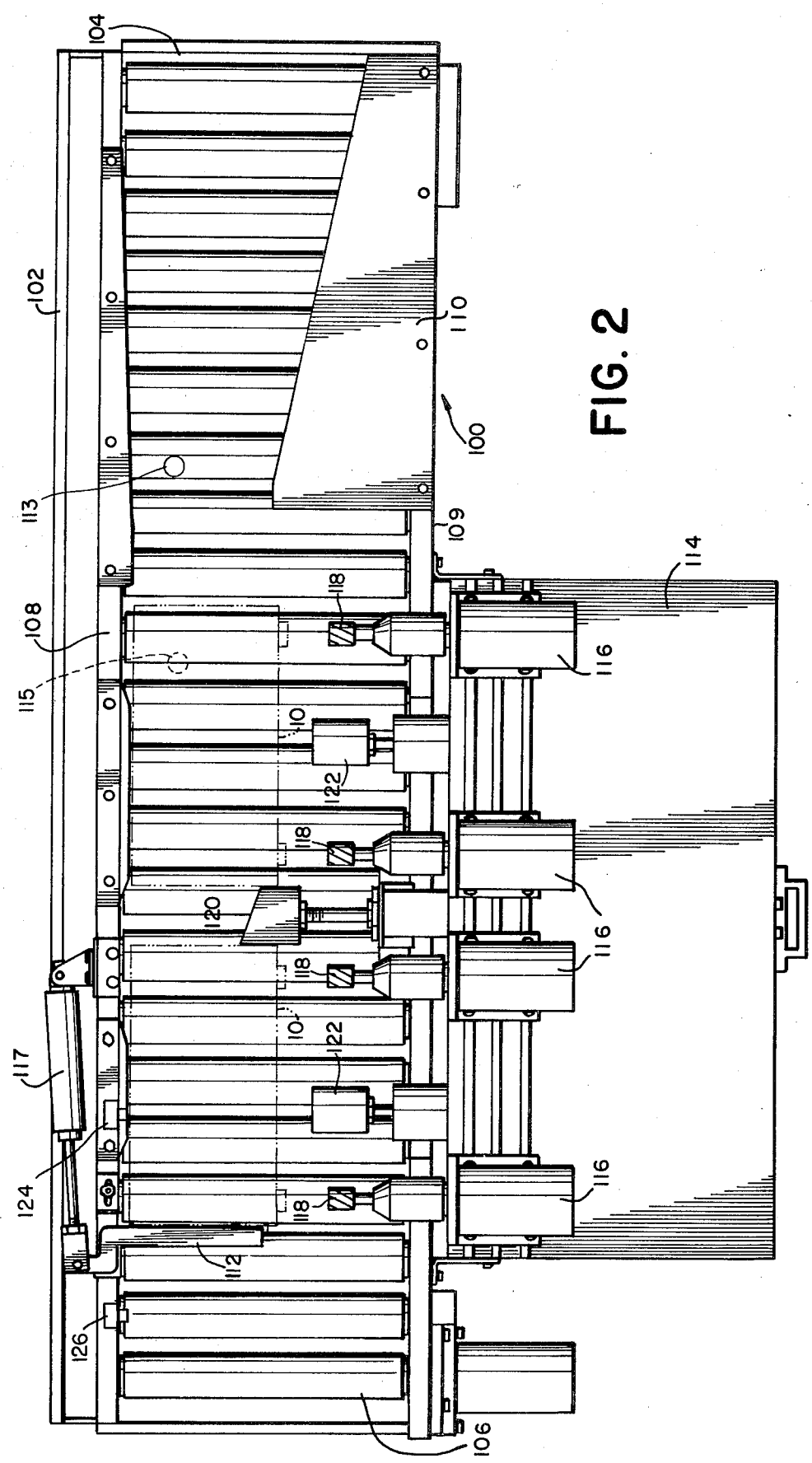
FIG. 2 is a top view of an apparatus adapted to remove said temporary side post terminals.

Referring now to FIGS. 2 and 3, there is a top and side view of apparatus 100 which is adapted to remove the temporary terminal posts 20 from case 10 to produce a finished side terminal battery case. As shown, it comprises a generally rectangular frame 102 which, in the preferred embodiment, is adapted to process a pair of batteries therein. This number, however, is purely arbitrary and the apparatus described herein can easily be adapted to process one, two or more batteries at a time, depending upon the needs of the process into which this apparatus is incorporated.

Positioned in a generally lengthwise oriented disposition upon and along frame 102 is an acid proof conveyor 104, which in the preferred embodiment, is comprised of a plurality of mutually driven rollers 106. A form of conveyor 104 which is particularly suitable for use in a battery production environment is shown in my co-pending application Ser. No. 894,349, "Acid Proof Conveyor", filed Apr. 7, 1978, now U.S. Pat. No. 4,225,037, and which is fully incorporated herein. Conveyor 104 both brings the partially completed battery cases into apparatus 100 for processing and removes them at the completion of the terminal removal operation for further fabrication steps. Along the outer side of conveyor 104 is a sidewall 108 which acts to confine the batteries within the conveyor 104 both during transit and processing. At the entrance to the conveyor on the side 109 opposite from wall 108 is a more or less triangularly shaped, horizontally disposed guide 110 which acts to intercept skewed and otherwise misaligned cases and to redirect them to a properly oriented position along wall 108.

At the exit end of conveyor 104 is a pivotal gate 112 which is biased to rotate inwardly so that it extends across conveyor 104 and intercepts the batteries traveling down it to stop them from moving further. This gate is situated on conveyor 104 in such a position that the first of the batteries, when stopped, will be in a proper position for the subsequent side terminal removal operation.

Down stream from guide 110 and fitted above conveyor 104 on side 109 is transversely reciprocal movable milling table 114 which contains, in the preferred embodiment, four horizontally disposed transversely oriented sideways slideable adjustable milling heads 116 which comprise a set of individual work station blocks. These blocks form a multiple positionable work station, somewhat similar to that shown in my co-pending application Ser. No. 149,268, "Multiple Position And Work Station For Battery Fabrication", dated May 12, 1980, now U.S. Pat. No. 4,359,075, which is incorporated by reference herein.

Working in conjunction with apparatus 100, is control means (not shown) which is programmed to control gate 112 so that the proper number of batteries are in the station at the time milling table 114 is actuated. In a continuously operating situation where a long stream of casees are being processed, this may be something as simple as a resetting timer which periodically actuates air cylinder 117 to open and close the gate. By way of example, sensor 113 and 115 may be used to control gate 112. A detailed description of sensor 113 and 115 may be found in U.S. Pat. No. 4,225,037 referenced hereinabove. In other situations more complex or detailed techniques may be used. However this control is exercised, when the time comes to remove side terminals 20 from the one or more cases within the apparatus, the control means causes table 114 to start to advance horizontally over wall 109 and across conveyor 104 towards sidewall 108. At the same time, the milling heads 116 are actuated and cutters 118 start to turn. By way of example, sensors 124 and 126 may be used to actuate milling heads 116 and cutters 118. A detailed description of sensors 124 and 126 may be found in U.S. Pat. No. 4,359,075 referenced hereinabove. Forwardly disposed in the front of table 114 is a tapered separator block 120 which is adapted to be inserted between the pair of batteries 10 within the station and clamp the first of these against gate 112 and move the second so that it is properly disposed relative to the advancing cutting heads. In the event that the batteries are not properly situated within the station and the cutting heads will not make proper contact with the temporary terminals, separator block 120 will sense this by making contact with a wall of a battery. This acts to force it backwardly against an internal limit switch (not shown) which is adapted to reverse the milling table drive means (not shown) and thus prevent potential damage to the batteries. If however, the batteries are properly positioned, the tapered separator inserts itself between the two batteries as the table continues moving in towards them and the forward progress continues unabated.

Further associated with table 114 is a set of spring biased buffer blocks 122, which make contact with the sidewise positioned battery cases 10 and push them firmly against wall 108. The springs 123 biasing the buffers compress with further inward travel of table 114 which compression securely clamps the cases 10 until the cutters 118 physically make contact with the temporary side terminals 20 and machines them off to produce the finished battery case 22.

At the conclusion of the cutting operation, the time of which, as noted above, is set by programmable control means so that terminals of varying sizes can be produced, table 114 reverses itself, retracting buffers 122 and separator 120 thus releasing the batteries. At the same time, gate 112 opens so that the batteries which have been processed exit the system and two new batteries can enter for subsequent processing.

It is to be understood that the foregoing suggested apparatus as exemplified by the figures, is intended to be illustrative of a preferred embodiment of the subject invention and that many options will readily occur to those skilled in the art without departure from the spirit or the scope of principals of the subject invention.

What I claim is:

1. In an apparatus simultaneously removing temporary side post terminals from at least one multi-celled, lead acid storage battery case having a pair of said terminals, said apparatus comprising horizontally reciprocating transverse cutting means, said cutting means further comprising a plurality of multi-positionable milling heads slideably set into a work station, each of said heads further having a cutter adapted to remove a side post terminal, the method of removing said terminals, comprising:

(a) transporting said battery case into said apparatus on conveyor means to a position wherefrom said terminals may be removed wherein said transporting step further comprises:

(i) intercepting and guiding skewed or misaligned battery cases against a sidewall of said conveyor to assume a properly oriented position for said side removal operation;
(ii) periodically closing a pivotable gate to stop said battery case at a time and position within said apparatus so that said cutting means, when actuated, will properly engage said case to remove said terminals; and
(iii) opening said gate at the completion of said side terminal removal operation, so that the finished case may be transported out of the apparatus for further processing;

(b) actuating said reciprocating cutting means so that they may advance across said conveyor to engage said battery for terminal removal;

(c) sensing that said battery case is correctly positioned on said conveyor relative to said advancing milling heads, and disengaging and reversing said advancing cutting means in the event that said case is not correctly positioned;

(d) clamping said battery case within said apparatus with spring biased buffer means so that said battery case will not move during terminal removal;

(e) machining off said temporary side terminal post, by said advancing milling heads; and (f) disengaging said milling heads by retracting said cutting means; and (g) transporting said machine battery cases out of said station.

2. The method of claim 1 wherein said apparatus is adapted to machine the side terminals off of a plurality of batteries, the step of inserting means between the batteries being machined so as to properly position each of them relative to said advancing milling heads.

3. An apparatus for simultaneously removing temporary side post terminals from at least one multi-celled lead acid storage battery case having a pair of said terminals, said apparatus comprising:
(a) a frame,
(b) conveyor means attached to said frame and adapted to carry said battery case into said apparatus for side terminal removal therein and further adapted to carry said battery out of said apparatus after said pair of side terminals have been removed; said conveyor means comprising:
 (i) horizontal guide means adapted to intercept skewed and misaligned batteries on said conveyor prior to their being carried into said apparatus and to redirect them to a properly oriented position for said side post removal operation; and
 (ii) pivotal gate means located at the exit of said apparatus, said gate being adapted to pivot inwardly to stop the passage of a battery case on said conveyor, said stoppage being at a place and at a time so that said case is properly positioned relative to said cutting means so that temporary side posts will be machined off when said cutting means is actuated, and further to pivot to an open position to allow said case to exit from the apparatus; and
 (iii) sidewall means associated with said conveyor and adapted to restrain said battery during said machine operation
(c) horizontal reciprocating transverse cutting means, said cutting means comprising:
 (i) a horizontally disposed, transversely movable reciprocating table mounted on said frame so that it may advance over said conveyor to engage said stopped battery for said cutting operation;
 (ii) separator means attached to the front of said table and forwardly directed said separator being adapted to sense if said battery case is properly positioned relative to said cutting means and further to cause said cutting means to reverse its direction so that said cutters will not contact said stop battery case, if it is not properly positioned; and
 (iii) spring biased buffer block means adapted to contact said battery and clamp them securely against said sidewall means of said conveyor means so that it will not move during said removal operation; and
(d) controlling means adapted to control and actuate said conveyor means and cutting means.

4. The apparatus of claim 3 wherein said apparatus is adapted to simultaneously machine the side terminals off of a plurality of batteries and said separator means is adapted to be inserted between said batteries so as to properly position each of them relative to the cutting means of said apparatus so that said side terminals will be properly machined off.

5. An apparatus for simultaneously removing temporary side post terminals from at least two storage batteries, said apparatus comprising:
(a) work station means positioned adjacent to said retained battery, said work station further comprising:
 (1) movable milling table including drive means for moving said movable milling table toward and away from said retained battery; and
 (2) at least two milling means mounted on said table, and
  (i) said movable milling table being horizontally disposed and reciprocally mounted so that when said drive means is actuated, said table is advanced so that said milling means engages said temporary post terminal and removes it wherein said milling table is further adapted to be retracted by said drive means after said terminal has been removed, wherein said work station means further comprises:
  (ii) sensor means attached to said movable milling table to advance therewith, said sensor means having at least one separator block adapted to fit between said batteries and separate them to properly position them relative to said advancing milling means, said separator block being further adapted to provide a signal causing said milling table drive to retract said milling table in the event that said advancing separator block can not advance between said batteries; and
(b) frame means;
 (i) said work station and drive means being operably attached to said frame means for receiving and retaining said storage battery wherein said frame means comprises conveyor means adapted to carry said storage battery into said apparatus for said side post terminal removal and further comprising horizontal guide means adapted to intercept skewed and misaligned batteries on said conveyor means and to re-direct them into a position properly oriented for side post terminal removal.

* * * * *